US010823131B2

United States Patent
John et al.

(10) Patent No.: US 10,823,131 B2
(45) Date of Patent: Nov. 3, 2020

(54) DUAL FUEL COMBUSTION CONTROL BASED ON COVARIED SPARK PRODUCTION AND PILOT SHOT DELIVERY

(71) Applicant: Caterpillar Inc., Deerfield, IL (US)

(72) Inventors: Bobby John, Peoria, IL (US); Jonathan Anders, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 69 days.

(21) Appl. No.: 16/289,594

(22) Filed: Feb. 28, 2019

(65) Prior Publication Data

US 2020/0277925 A1    Sep. 3, 2020

(51) Int. Cl.

| F02P 5/00  | (2006.01) |
| F02P 5/15  | (2006.01) |
| F02D 41/00 | (2006.01) |
| F02D 41/40 | (2006.01) |
| F02D 13/02 | (2006.01) |
| F02D 41/38 | (2006.01) |
| F02D 37/02 | (2006.01) |

(52) U.S. Cl.
CPC .......... *F02P 5/005* (2013.01); *F02D 13/0238* (2013.01); *F02D 41/0027* (2013.01); *F02D 41/403* (2013.01); *F02P 5/15* (2013.01); *F02D 37/02* (2013.01); *F02D 2041/389* (2013.01); *F02D 2200/021* (2013.01)

(58) Field of Classification Search
CPC .... F02P 5/005; F02P 5/045; F02P 5/14; F02P 5/142; F02P 5/15; F02D 13/0207; F02D 37/02; F02D 41/0027; F02D 41/403
See application file for complete search history.

(56) References Cited

U.S. PATENT DOCUMENTS

| 6,032,640 | A  | * | 3/2000  | Evans ................. F02D 41/2422 123/295 |
| 6,276,334 | B1 |   | 8/2001  | Flynn et al. |
| 6,505,601 | B1 |   | 1/2003  | Jorach et al. |
| 6,640,773 | B2 |   | 11/2003 | Ancimer et al. |
| 6,907,870 | B2 |   | 6/2005  | Zur Loye et al. |
| 6,915,776 | B2 |   | 7/2005  | zur Loye et al. |
| 7,007,669 | B1 |   | 3/2006  | Willi et al. |
| 7,469,662 | B2 | * | 12/2008 | Thomas ................. F02B 19/12 123/258 |
| 7,574,993 | B2 |   | 8/2009  | Gillespie et al. |
| 7,841,308 | B1 |   | 11/2010 | Muth |
| 10,273,894 | B2 |  | 4/2019  | Tripathi |
| 2002/0157619 | A1 | * | 10/2002 | Gray ................. F02D 19/0649 123/1 A |

(Continued)

FOREIGN PATENT DOCUMENTS

WO    2012010237 A1    1/2012

*Primary Examiner* — Sizo B Vilakazi
*Assistant Examiner* — Anthony L Bacon
(74) *Attorney, Agent, or Firm* — Brannon Sowers & Cracraft

(57) ABSTRACT

Operating a dual fuel engine system includes igniting a main charge of gaseous fuel in response to combustion of an early pilot shot of liquid fuel and production of a spark. Operating the system also includes covarying a spark timing parameter and a pilot shot delivery parameter, and reducing an error in a phasing of combustion of another main charge based on the covarying of the spark timing parameter and the pilot shot delivery parameter.

20 Claims, 4 Drawing Sheets

(56) References Cited

U.S. PATENT DOCUMENTS

| | | | |
|---|---|---|---|
| 2002/0166515 A1* | 11/2002 | Ancimer | F02D 19/0689 123/27 R |
| 2007/0000456 A1* | 1/2007 | Wong | F02D 19/105 123/27 GE |
| 2009/0266335 A1* | 10/2009 | Kawamura | F02D 41/00 123/406.19 |
| 2013/0146037 A1 | 6/2013 | Han et al. | |
| 2015/0226144 A1* | 8/2015 | Sixel | F02D 41/0085 123/406.21 |
| 2016/0061134 A1* | 3/2016 | Fletcher | F02D 41/1446 701/102 |
| 2016/0069291 A1* | 3/2016 | Ge | F02B 1/14 701/103 |
| 2016/0177851 A1 | 6/2016 | Gruber et al. | |
| 2016/0177854 A1* | 6/2016 | Gruber | F02D 41/1498 123/254 |
| 2016/0230645 A1* | 8/2016 | Schock | F02F 1/4285 |
| 2019/0338714 A1* | 11/2019 | Sixel | F02D 35/023 |

\* cited by examiner

DUAL FUEL COMBUSTION CONTROL BASED ON COVARIED SPARK PRODUCTION AND PILOT SHOT DELIVERY

TECHNICAL FIELD

The present disclosure relates generally to combustion control in a dual fuel engine system, and more particularly to controlling combustion of a main charge of gaseous fuel ignited by combustion of an early pilot shot of a liquid fuel and a spark.

BACKGROUND

Internal combustion engines are used in virtually innumerable applications throughout the world for vehicle propulsion, electric power generation, handling of liquids and gases, and for various industrial purposes. In a typical operating scheme, fuel and air is combusted within an engine cylinder to produce a rapid rise in pressure and thus drive a piston to rotate a crankshaft. Spark-ignited engines typically employ a liquid petroleum distillate fuel such as gasoline, or various gaseous fuels including natural gas, methane, propane, various mixtures of these, and still others. Compression-ignition engines conventionally utilize fuels such as diesel distillate fuel, biodiesel, and still others. Combustion science research in recent years has paid great attention to engine systems and operating strategies that are flexible with regard to fuel utilization, notably gaseous fuels. Fuel prices can be fairly dynamic, and flexibility with regard to a type of fuel used in an engine can provide economic advantages. Various gaseous fuels also have desirable combustion or emissions properties which can be advantageously exploited.

Engines that allow for operation with different fuel types combining both a liquid fuel such as diesel distillate and natural gas are in increasing use throughout the world. Diesel and similar fuels are relatively easy to compression ignite, but can produce undesirable emissions. Natural gas and other gaseous fuels, when used in a compression-ignition engine, can fail to ignite, knock, or have problems with combustion stability. Such challenges can be especially acute in so-called lean burn applications where gaseous fuel and air are burned or attempted to be burned at a stoichiometrically lean equivalence ratio. Gaseous fuels can also have a range of quality depending upon the nature of the constituents. Gaseous fuels that have relatively higher proportions of methane tend to compression ignite relatively less easily than other fuels containing longer chain hydrocarbons. Consequently, different fuels and fuel blends can have varying ignition and combustion properties.

Dual fuel engines utilizing one or more shots of liquid fuel in relatively small quantities to ignite a larger main charge of gaseous fuel are known. Such engines can address some of the foregoing problems, making combustion relatively more predictable and controllable. In certain of these engines multiple different operating modes are possible, ranging from liquid-only compression ignition modes to gaseous fuel-only spark-ignition modes. Diesel combustion, even at relatively small quantities, can still produce undesired emissions and require higher costs than gaseous fuel alone. A panoply of technical challenges remain regarding combustion control in engines having more than one mode of available operation. One example dual fuel engine employing a diesel pilot injection to ignite natural gas is known from U.S. Pat. No. 6,032,617 to Willi, et al.

SUMMARY OF THE INVENTION

In one aspect, a method of operating a dual fuel engine system includes igniting a main charge of gaseous fuel within a cylinder in a dual fuel engine in a first engine cycle in response to combustion of an early pilot shot of liquid fuel and production of a spark. The method further includes igniting a main charge of gaseous fuel within the cylinder in the dual fuel engine in a second engine cycle in response to combustion of an early pilot shot of liquid fuel and production of a spark. The method still further includes covarying a spark timing parameter and a pilot shot delivery parameter from the first engine cycle to the second engine cycle, and reducing an error in a phasing of combustion from the first engine cycle to the second engine cycle based on the covarying of the spark timing parameter and the pilot shot delivery parameter from the first engine cycle to the second engine cycle.

In another aspect, a combustion control system for a dual fuel engine system includes a sparkplug having spark electrodes forming a spark gap and structured for producing an electrical spark within a cylinder in a dual fuel engine, and an electrically actuated liquid fuel injector structured to directly inject an early pilot shot of liquid fuel into the cylinder in the dual fuel engine. The combustion control system further includes a combustion control unit coupled with the sparkplug and with the liquid fuel injector. The combustion control unit is structured to covary a spark timing parameter of the sparkplug and a pilot shot delivery parameter of the liquid fuel injector. The combustion control unit is further structured to reduce an error in a phasing of combustion in the dual fuel engine system based on the covarying of the spark timing parameter and the pilot shot delivery parameter.

In still another aspect, a method of operating a dual fuel engine system includes commanding injection of an early pilot shot of liquid fuel and production of a spark to ignite a main charge of gaseous fuel within a cylinder in a dual fuel engine. The method further includes covarying a spark timing parameter and an early pilot shot delivery parameter based on a phasing of combustion of the main charge of gaseous fuel. The method still further includes reducing an error in a phasing of combustion of another main charge of gaseous fuel ignited by combustion of an early pilot shot of liquid fuel and production of a spark based on the covarying of the spark timing parameter and the pilot shot delivery parameter.

DETAILED DESCRIPTION

Figure 1:
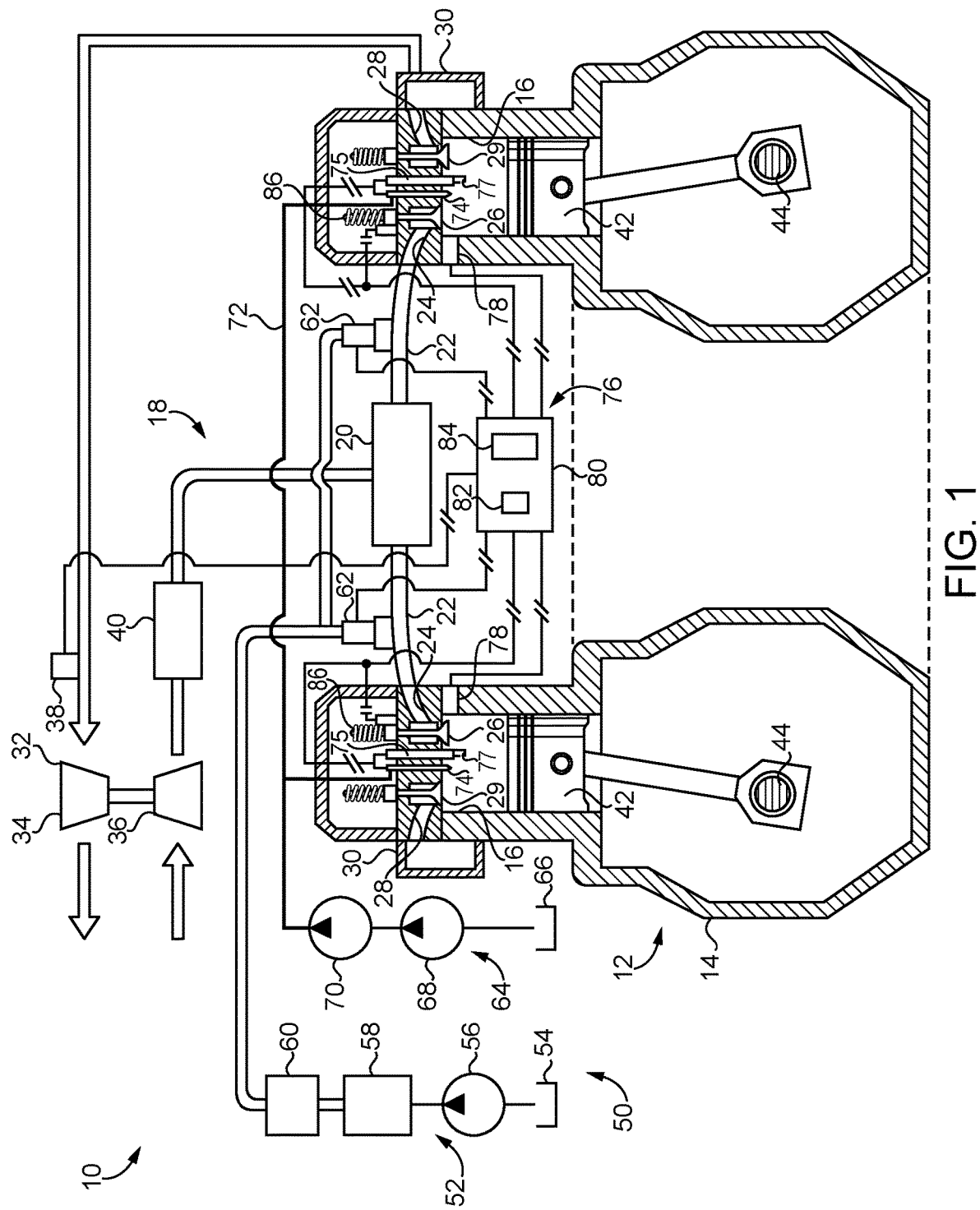
FIG. 1 is a partially sectioned side diagrammatic view of a dual fuel engine system, according to one embodiment.

Referring to FIG. 1, there is shown a dual fuel engine system 10 according to one embodiment, and including an internal combustion engine 12 having an engine housing 14 with a plurality of cylinders 16 formed therein. Internal combustion engine 12 (hereinafter "engine 12") could include a total of one cylinder, or multiple cylinders arranged in an in-line configuration or a V-configuration, for example, or in any other suitable arrangement. Discussion herein of a single cylinder 16, or other elements, components, or characteristics, of engine 12 or associated apparatus in the singular should be understood to refer by way of analogy to any of a plurality of those elements, components, characteristics, except where otherwise indicated or apparent from the context. A piston 42 is positioned at least partially within cylinder 16 and structured to reciprocate in response to combustion of fuel and air in cylinder 16 to rotate a crankshaft 44 in a generally known manner. Engine 12 will typically operate in a conventional four-cycle pattern, although the present disclosure is not thereby limited. Dual fuel engine system 10 also includes an intake system 18 having an intake manifold 20 fluidly connected with a plurality of intake runners 22. Intake runners 22 are structured to feed air for combustion to each of cylinders 16. Engine housing 14 has an intake conduit 24 formed therein, and an intake valve 26 is movable between an open position and a closed position to fluidly connect and disconnect cylinder 16 with intake conduit 24. Engine housing 14 also includes an exhaust conduit 28 formed therein. An exhaust valve 29 is movable between an open position and a closed position to fluidly connect and disconnect cylinder 16 with exhaust conduit 28. Exhaust conduit 28 is structured to feed exhaust from engine 12 to an exhaust manifold 30.

Dual fuel engine system 10 may further include a turbocharger 32 having a turbine 34 structured to receive a flow of exhaust gases from exhaust manifold 30, and operable to rotate a compressor 36 that compresses intake air in intake system 18 for delivery to cylinder 16. A waste gate 38, which will typically be electronically controlled, is positioned fluidly between exhaust manifold 30 and turbine 34 to enable exhaust to be selectively bypassed around or past turbine 34 in a manner that varies boost pressure produced by compressor 36 according to generally known principles. Waste gate 38 can be understood as an air-fuel ratio control element operated to selectively open to limit compression and therefore density of intake air, or close to increase compression and therefore density of intake air supplied to cylinder 16. Waste gate 38 can have a range of positions between fully closed and fully open. Operating waste gate 38, or other apparatus producing functionally analogous results, enables air-fuel ratio to be controlled. Turbocharger 32 could include a first turbocharger stage, with a second turbocharger providing a second turbocharger stage and positioned downstream of turbocharger 32. Dual fuel engine system 10 could include a plurality of waste gates associated one with each of a plurality of turbines in a plurality of turbochargers. An intake airflow control element in the nature of a compressor bypass valve (not shown) might additionally or alternatively be provided to enable intake air to bypass compressor 36 and vary pressurization of the intake air for controlling air-fuel ratio in a manner generally analogous to that described in connection with waste gate 38. Engine system 10 could also include apparatus for recirculating exhaust, although one practical implementation includes no exhaust recirculation apparatus at all.

Dual fuel engine system 10 further includes a fuel system 50 having a gaseous fuel subsystem 52 with a gaseous fuel supply 54. Gaseous fuel supply 54 may include a cryogenic liquified gaseous fuel supply storing liquified natural gas (LNG) or another suitable fuel that is gaseous at standard temperature and pressure. Example gaseous fuels include not only natural gas but also methane, ethane, biogas, propane, landfill gas, mixtures of these, and still others. As further discussed herein, dual fuel engine system 10 can be structured to operate at a stoichiometrically lean equivalence ratio of fuel to air. Dual fuel engine system 10 is further structured to operate on gaseous fuel having a range of fuel quality including gaseous fuels having a methane number less than 70, potentially less than 60, or still lower, for example. Dual fuel engine system 10 may operate at liquid fuel substitution rates greater than 90%, potentially greater than 95%, and perhaps approaching 99%. Liquid fuel substitution rate means a relative proportion of total fuel energy that is provided by gaseous fuel rather than liquid fuel, in comparison to engine operation at 100% liquid fuel. The liquid fuel used in dual fuel engine system 10 may be diesel distillate fuel, however, the present disclosure is not thereby limited.

Gaseous fuel subsystem 52 may include a cryogenic pump 56, for conveying gaseous fuel in a liquified state from gaseous fuel supply 54 to a vaporizer 58. Vaporizer 58 thenceforth supplies the gaseous fuel now in a gaseous state to a pressurization pump 60. Alternative gaseous fuel supply and vaporization equipment could be used different from that depicted in FIG. 1, such as a system storing gaseous fuel in a pressurized gaseous state instead of a cryogenically stored liquid state. Pump 60 feeds gaseous fuel to an electronically controlled gaseous fuel admission valve 62 coupled with engine housing 14 and structured to admit the gaseous fuel for combustion in cylinder 16. In the embodiment of FIG. 1, a plurality of gaseous fuel admission valves 62 are shown each coupled with an intake runner 22, enabling gaseous fuel supply to be independently varied amongst the plurality of cylinders 16. In other embodiments, gaseous fuel could be admitted to intake manifold 20, injected directly into cylinder 16, or in some instances mixed with intake air upstream of compressor 36.

Fuel system 50 further includes a liquid fuel subsystem 64 for supplying the liquid fuel, and including a liquid fuel supply 66, such as a fuel tank, a fuel transfer pump 68, and a fuel pressurization pump 70. Fuel pressurization pump 70 can supply liquid fuel at a pressure suitable for injection to a common rail 72 or similar common reservoir storing a volume of pressurized liquid fuel. In other instances, unit pumps or the like could be used and each associated with one or more of the plurality of cylinders 16. Common rail 72 feeds pressurized liquid fuel to a plurality of electronically controlled liquid fuel injectors 74. Liquid fuel injectors 74 are structured to directly inject the liquid fuel into each of the plurality of cylinders 16. One electronically controlled liquid fuel injector is associated with each cylinder 16, however, in other instances each cylinder 16 could be equipped with a plurality of liquid fuel injectors including, for instance, a first liquid fuel injector for injecting relatively small pilot shots of liquid fuel into cylinder 16 during dual fuel operation, and a second liquid fuel injector structured to inject the liquid fuel into cylinder 16 during a diesel-only mode of operation, or some other operating mode. A single fuel injector with multiple sets of spray orifices for injecting liquid fuel in different spray patterns at different times, or with different steady flow rates could also be used.

Dual fuel engine system 10 also includes a sparkplug 75 mounted in engine housing 14 and including spark electrodes (not numbered) positioned within cylinder 16 and forming a spark gap 77 therein for production of an electrical spark to ignite a main charge of gaseous fuel in a gaseous fuel-only mode, or in a hybrid mode such as where an early pilot shot of liquid fuel and a spark are used cooperatively to ignite a main charge of gaseous fuel. A small particle, burst, or other concentration of combusting liquid fuel could also be understood as a spark within the present context. Dual fuel engine system 10 further includes a combustion control system 76. Combustion control system 76 is structured to control characteristics of combustion in engine 12 including properties of a phasing of combustion such as combustion duration, combustion timing, a shape of a combustion phasing curve, to name some examples. Each electronically controlled liquid fuel injector 74 and each of a plurality of sparkplugs 75 associated one with each of the plurality of cylinders 16 can be understood as part of combustion control system 76. Combustion control system 76 further includes a phasing sensor or combustion sensor 78 structured to produce phasing data indicative of a phasing of combustion in cylinder 16 in engine 12.

In one practical implementation strategy, combustion sensor 78 includes a pressure sensor exposed to a fluid pressure of cylinder 16 of a generally known type having a deformable element, a strain gauge, or still another element having an electrical state such as a voltage or a resistance that varies in response to varying of pressure within cylinder 16. Combustion sensor 78 could also include an optical sensor in certain instances. Combustion sensor 78 is mounted in engine housing 14 and could be positioned within a cylinder block or a cylinder head of engine housing 14 in a generally known manner. The phasing data may be indicative of a phasing of combustion of a main charge of gaseous fuel ignited in response to combustion of an early pilot shot of liquid fuel and production of a spark in an engine cycle. Combustion control system 76 can further be understood to include waste gate 38, or a separate electrical actuator (not shown) for waste gate 38, as well as the various electrical actuators that are associated with gaseous fuel admission valve 62, and liquid fuel injector 74. Combustion control system 76 also includes an electronically controlled variable valve actuator 86 coupled with intake valve 26 and structured to position intake valve 26 to vary a relative position and state of intake valve 26, including a closing timing such as a late closing timing, from engine cycle to engine cycle as further discussed herein.

Combustion control system 76 also includes an electronic control unit or combustion control unit 80 coupled to combustion sensor 78 and the other electronically controlled components and sensors of dual fuel engine system 10. Combustion control unit 80 is structured to receive signals output by combustion sensor 78, or to interrogate combustion sensor 78, or otherwise receive electronic data produced by combustion sensor 78, for the control purposes further discussed herein. The phasing data produced by combustion sensor 78 may be data encoded in a fluid pressure signal or a mechanical strain signal or the like. Combustion control unit 80 also includes a data processor 82 coupled with a computer-readable memory 84. Data processor 82 can be any suitable central processing unit such as a microprocessor or a microcontroller, or a field programmable gate array, for example. Computer-readable memory 84 can likewise include any suitable computer-readable memory such as RAM, ROM, DRAM, SDRAM, FLASH, a hard drive, or still another. Computer-executable program instructions for operating dual fuel engine system 10 may be stored on memory 84, as well as the various maps referenced during execution of program instructions by way of data processor 82 according to the present disclosure.

As suggested above, combustion control unit 80 can be structured for controlling combustion, including properties of a phasing of combustion, for a main charge of gaseous fuel ignited by combustion of an early pilot shot of liquid fuel and production of a spark in cylinder 16. It is believed that an initial, relatively slow and cool combustion of an early pilot shot can produce a combustion flame producing very low emissions such as oxides of nitrogen or "NOx" and particulates or soot, and burns at locations generally radially outward close to a periphery of cylinder 16 and piston 42 while piston is traveling toward a top dead center position in a compression stroke. A spark can be produced at a crank angle close to the top dead center position to produce another combustion flame that merges with the early pilot combustion flame to rapidly trigger conditions suitable for igniting a lean main charge of gaseous fuel. The early pilot shot can be injected at a timing that follows shortly after a late intake valve closing timing, such as a closing timing at about minus 60° crank angle before top dead center. The late intake valve closing timing can be varied for certain effects as further discussed herein, and assists in slowing and cooling the combustion in a manner facilitating consistent, reliable pilot ignition of the main charge of gaseous fuel with low levels of certain emissions. As will be further apparent from the following description, cycle-to-cycle adjustments to a valve timing parameter such as the intake valve closing timing, to a pilot shot delivery parameter such as an early pilot shot timing or an early pilot shot quantity, and to a spark timing parameter such as a spark timing, allows a phasing of combustion of the main charge to be controlled in a manner that is successful for lean mixtures at high substitution rates, with a desirable emissions profile.

As further discussed herein, one or both of the spark timing parameter and the pilot shot delivery parameter can be adjusted from a first engine cycle to a second engine cycle based on phasing data produced by phasing sensor 78. The valve timing parameter can be adjusted from cycle-to-cycle as well. It has further been discovered that covarying the spark timing parameter and the pilot shot delivery parameter can robustly support reducing an error in a phasing of combustion. As used herein the term "covarying" and related terms can be understood to mean that the variables of interest are both adjusted, together, based on the occurrence of certain predetermined criteria. For instance, when a phasing of combustion is shifted, such as in time or duration, from a desired phasing of combustion, from a first engine cycle to a second engine cycle both of the spark timing parameter and the pilot shot delivery parameter can be adjusted. It is believed that linking the adjustments to the parameters in this way can provide a practical approach offering improved control over phasing of combustion from what might be achieved by varying only one of the subject parameters. The manner, purpose, and effect of varying and covarying the various parameters will be further apparent from the following description.

Figure 2:
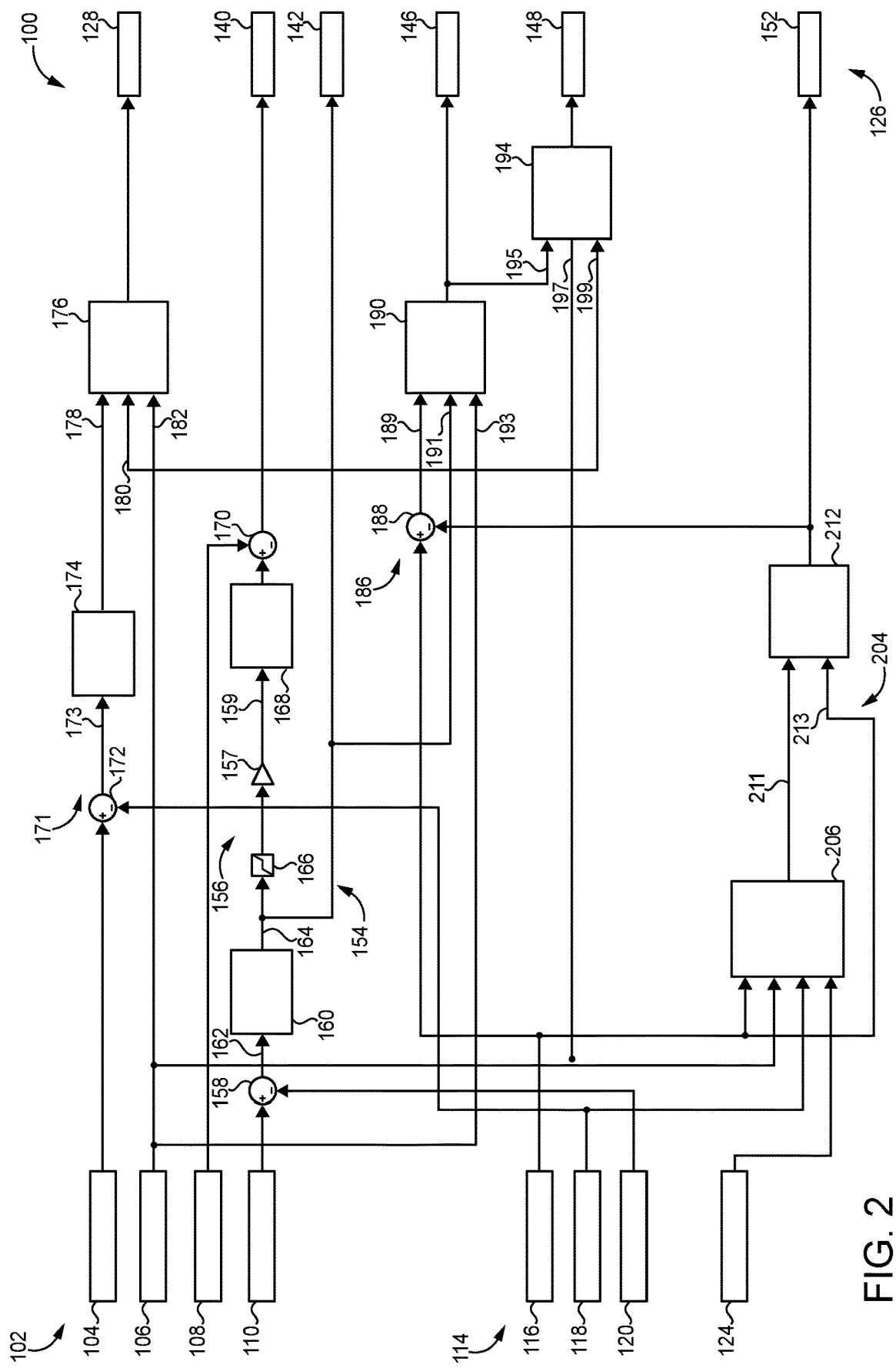
FIG. 2 is a control diagram for controlling a dual fuel engine system, according to one embodiment.

Referring also now to FIG. 2, there is shown a control diagram 100 according to one embodiment and illustrating a plurality of control targets at 102, feedback signals and inputs at 114, and outputs or commands at 126. Control targets 102 can include a target lambda 104, a target engine speed 106, a target intake valve actuation or IVA 108, a target crank angle total fuel charge burn location 110 ("target location 110"). Signals/inputs 114 can include a total fuel from governor input 116, a lambda input 118, a fuel charge burn location input 120, and an IMAT input 124. The total fuel charge burn location input 120 can include or be derived from the phasing data as discussed herein. Target location 110 could include a crank angle target, such as a crank angle target where a certain percentage, for example 50%, of total fuel has been burned. Other targets and feedbacks for objectively characterizing phasing of combustion for control purposes contemplated herein could be used. Outputs/commands 126 can include a waste gate command 128, an intake valve actuation or IVA command 140, a spark timing or main timing command 142, an early pilot shot quantity command 146, an early pilot shot timing command 148, and a gaseous fueling command 152. Early pilot shot quantity command 146 can include or be the basis for an injection duration, and affects an amount of liquid fuel allocated to an early pilot shot as further discussed herein. Control diagram 100 further includes a spark timing calculation 154, an intake valve actuation calculation 156, a gaseous fueling calculation 204, and a waste gate calculation 171. The various calculations are performed by combustion control unit 80, or multiple control units, to control combustion and combustion phasing in dual fuel engine system 10.

It will be recalled that one of targets 102 is target location 110. An adder 158 determines a difference between target location 110 and an observed total fuel charge burn location as indicated by input 120, thus calculating a control term or raw error 162 in a timing of combustion. Raw error 162 can thus reflect an error in phasing of combustion from a first engine cycle to a second engine cycle. A proportional control such as a PID control 160 outputs a compensated control term 164 based on raw error 162. The compensated control term 164 can be used as the basis for outputting spark timing or main timing command 142. The compensated control term 164 can also serve as the basis for IVA command 140 in calculation 156. IVA command or valve timing command 140 can be determined according to a time scale different from a time scale of determining any of commands 142, 146, or 148, which can each be understood as a pilot shot fueling or fuel injection command. Calculation 156 can include a wait cycle or dead zone 166, a gain 157, and another proportional control such as another PID control 168. An adder 170 determines the difference between the output of PID control 168 and target IVA 108. Calculation 156 can further be understood to determine an intake valve actuation or IVA error at adder 170 that serves as the basis for IVA command 140. It will be recalled that control term 164 is based on a difference or error between target location 110 and the observed fuel burn location indicated by input 120. IVA command 140 is thus understood to be based on a main timing or spark timing error. Still another way to understand calculations 154 and 156 is that combustion control unit 80 is adjusting spark timing and a pilot shot delivery parameter in a relatively faster control loop calculation, and determining a valve timing for intake valve 26, such as a valve closing timing, based on the spark timing error in a relatively slower control loop calculation. Spark timing error can be used as a principle control for varying phasing of combustion, and adjusted in a manner covarying with the pilot shot delivery parameter from a first engine cycle to a second engine cycle. Where spark timing error becomes too large, such as where spark timing has shifted farther than desired from a top dead center crank angle location, valve timing adjustment can bring spark timing back closer to top dead center. It should further be appreciated that valve timing adjustment varies in-cylinder temperature by adjusting effective compression ratio. Other techniques for varying in-cylinder temperature could be employed, such as variable cooling of compressed intake air, or variable cooling or delivery of recirculated exhaust if used.

Combustion control unit 80 can thus be understood to output a pilot fueling command according to a pilot shot delivery parameter that includes at least one of an early pilot shot timing or an early pilot shot quantity. The spark timing and the early pilot shot timing and/or pilot shot quantity commands can be based on the phasing data produced by combustion sensor 78. Combustion control unit 80 can further be understood to output a valve timing command according to an intake valve timing parameter, which can include a late closing timing. Calculation 186 in control diagram 100 provides adjustment to the pilot shot delivery parameter from one engine cycle to another. An adder 188 receives a total fuel from governor input 116, and calculates a difference between the total fuel from governor and a gas quantity calculated at 212, to produce a diesel fueling control term 189 that is input to a diesel fueling map 190. Diesel fueling map 190 also has as coordinates a spark timing input 191, and an engine speed input 193. An output from map 190 serves as the basis for early pilot quantity command 146. Another map 194 is used to determine early pilot timing command 148 based on early pilot quantity amount 195, engine speed 197, and an intake valve closing timing 199.

In calculation 204, a max substitution map 206 receives as inputs IMAT, lambda feedback, engine speed, and total fuel from governor by way of inputs 124, 118, and 116, respectively. An output or substitution rate 211 from map 206 and a total fuel from governor input 213 are processed in a gas quantity calculation 212 to produce gas command 152.

Calculations 171 determine waste gate command 128 and can include an adder 172 that determines a difference between target lambda 104 and observed lambda 118, with a lambda error 173 processed at a proportional control such as another PID 174. The output of PID 174 can include a waste gate command term 178 that is inputted to a waste gate surge map 176 along with an intake valve closing timing input 180 and an engine speed input 182 to produce waste gate command 128. By way of calculations 171, combustion control unit 80 adjusts waste gate 38 based on intake valve closing timing to ensure air-to-fuel ratio (AFR) remains or becomes suitable for stoichiometrically lean combustion of the main charge of gaseous fuel.

INDUSTRIAL APPLICABILITY

From the following description it will be appreciated that there are a number of different control "knobs" representing different parameters that can be adjusted to reduce an error in a phasing of combustion from a first engine cycle to a second engine cycle, and from a second engine cycle to a third engine cycle, and so on. It will also be recalled that differing fuel quality, such as differing methane number among fuels, can affect combustion characteristics. Relatively more easily compression-ignited ethane or propane in a fuel blend of mostly methane can cause premature ignition, engine knock, for instance. Phasing control according to the present disclosure enables adjustments to in-cylinder temperature, such as by way of adjusting intake valve late closing timing, as well as adjustments to pilot fuel delivery to correct or prevent excursions in phasing of combustion such as might be otherwise observed where fuel quality changes, either because fuel supplies are deliberately shifted from one fuel supply to another or because a supply of fuel is itself inconsistent in fuel quality over time. Such capabilities provide advantages over known strategies which are often purpose built and tuned for a particular fuel quality, or which simply accept performance limitations.

Figure 3:
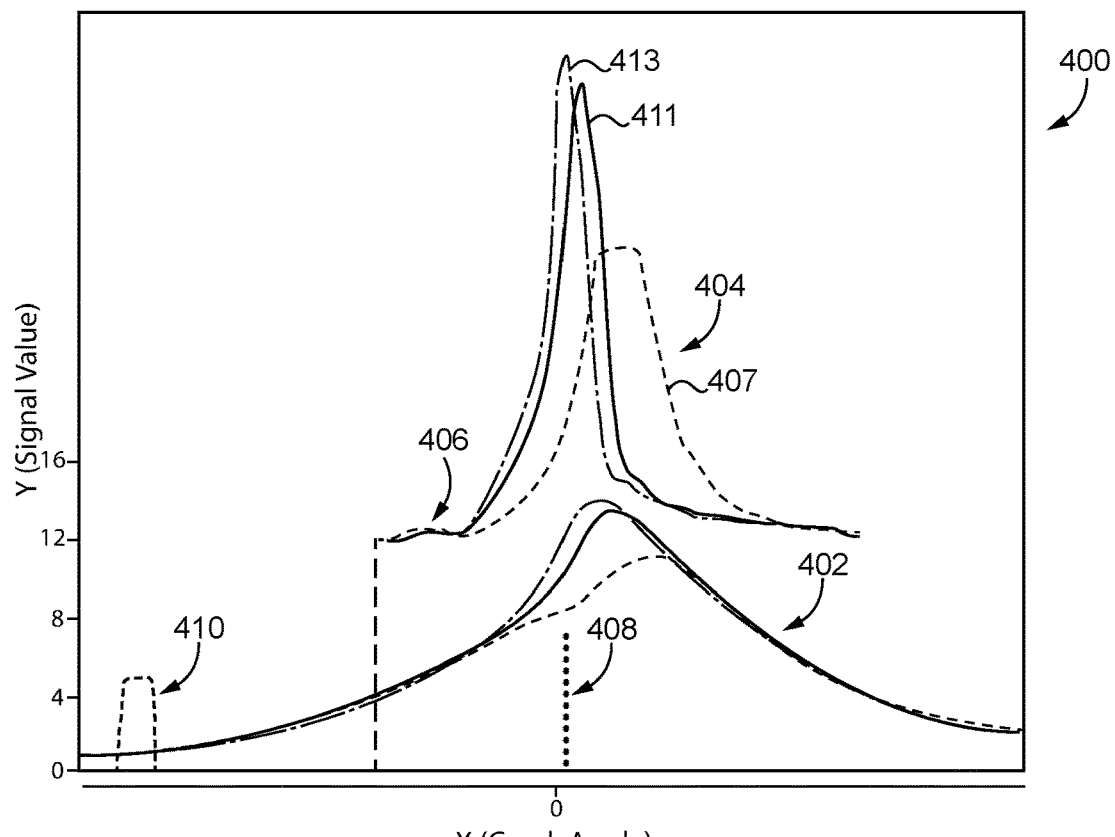
FIG. 3 is a graph illustrating combustion phasing characteristics varied in response to adjustment to a valve timing parameter.

It will also be appreciated that limitations respecting fuel quality may be most acute at high substitution rates. As discussed, varying spark timing is one control that enables reducing an error in phasing of combustion. In general terms, as spark timing retards, combustion phasing retards, and combustion duration increases. As spark timing advances generally converse observations can be expected. As also discussed above, varying of spark timing can be coupled with varying of pilot shot delivery characteristics. Referring now to FIG. 3, there is shown a graph 400 illustrating example varying of phasing of combustion in response to adjusting intake valve closing timing, and including cylinder pressure at a curve 402, heat release at a curve 404 formed by traces 407, 411, and 413, an early pilot shot at 410, and a spark at 408. Crank angle is shown on the X-axis, and signal value on the Y-axis. Trace 407 corresponds to a latest intake valve closing timing, trace 411 corresponds to an earlier intake valve closing timing, and trace 413 corresponds to a still earlier intake valve closing timing. The intake valve closing timings of traces 407, 411, and 413 might correspond to intake valve closing timings varied in a range from less than 80° before top dead center in the case of trace 407, to more than 100°, but less than 180°, before top dead center in the case of trace 413. It can be noted that as intake valve closing retards, phasing of combustion retards, combustion duration increases, and peak cylinder pressure decreases. Converse observations can be expected as intake valve closing advances. It should further be understood that adjustments to the intake valve timing parameter, e.g. intake valve closing timing, can provide relatively dramatic changes to phasing of combustion in comparison to adjustments to other parameters. Hence, varying intake valve timing can be understood as a rougher adjustment control knob, whereas varying spark timing, varying early pilot shot delivery, or covarying spark timing and early pilot shot delivery, i.e. early pilot timing or early pilot quantity, can be understood as a finer adjustment control knob. Both spark timing and early pilot shot quantity may be covaried from a first engine cycle to a second engine cycle, increasing the relative impact on phasing of combustion over an adjustment to these parameters individually. Adjusting intake valve late closing timing, such as from a second engine cycle to a third engine cycle, can reduce an error in phasing of combustion based on spark timing or main timing error, and can subordinate or supplement simultaneous adjustments affecting phasing to pilot shot delivery or spark timing given the relatively greater impact of the "rougher" in-cylinder temperature control enabled by the varying of effective compression ratio.

Figure 4:
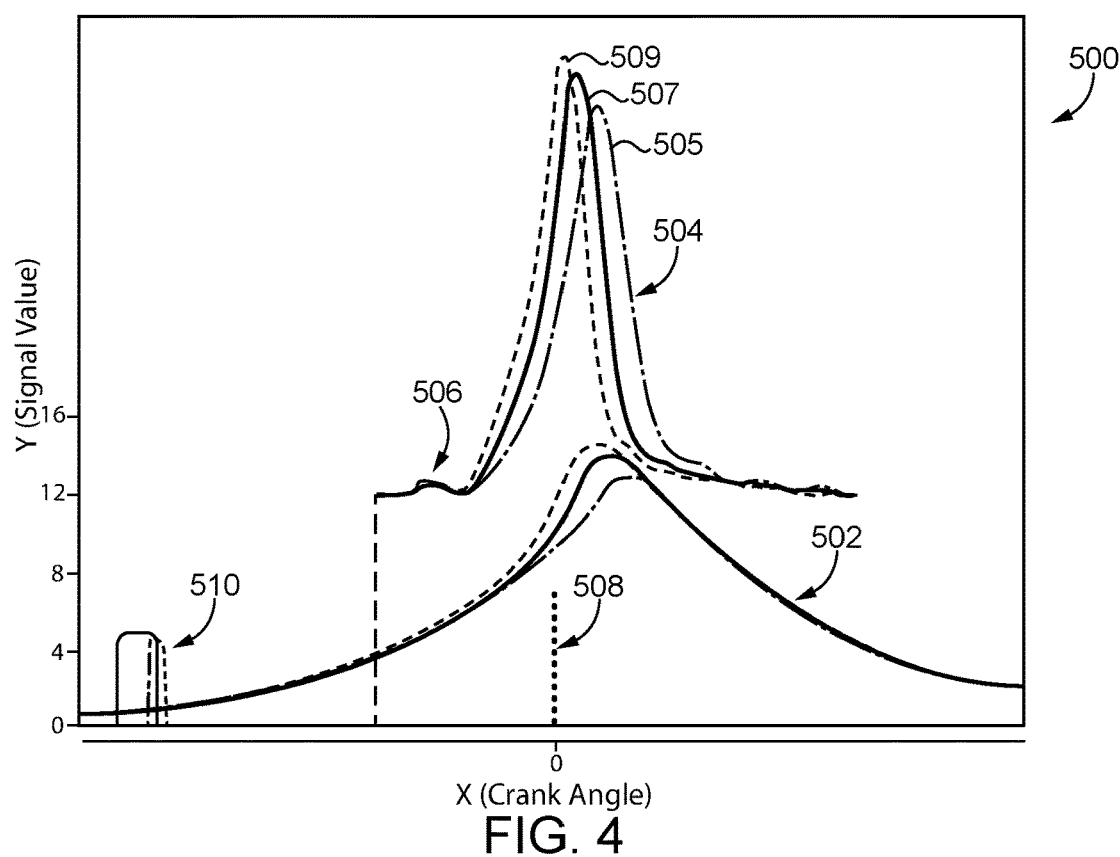
FIG. 4 is a graph illustrating combustion phasing characteristics varied in response to adjustment to an early pilot shot quantity.

Referring now to FIG. 4, there is shown another graph 500 illustrating an effect on combustion phasing of adjusting early pilot shot quantity. Cylinder pressure is shown at a curve 502, heat release at a curve 504 formed by traces 505, 507, and 509, which correspond to early pilot shot quantities shown at pilot shots 510. The line pattern at pilot shots 510 corresponds to the line patterns of traces 505, 507, and 509 to which the pilot shots correspond. Traces 505, 507, and 509 are what might be expected by varying injection durations at consistent rail pressure. It can be noted that as early pilot shot quantity increases, combustion phasing advances, combustion duration decreases, and peak cylinder pressure increases. As early pilot shot quantity decreases, converse observations can be expected. It will be recalled that spark timing and early pilot shot quantity may be adjusted in a covarying manner. In map 190 in control diagram 100, an early pilot shot quantity is mapped to spark timing. As calculation 154 adjusts spark timing, early pilot shot quantity and timing will naturally be adjusted, with early pilot shot timing advancing or retarding based, respectively, on the advancing or retarding of the spark timing. Early pilot shot quantity can also be increased or decreased based, respectively, on advancing or retarding spark timing. In one implementation, early pilot shot quantity is increased and early pilot shot timing advanced based on advancing spark timing, and early pilot shot quantity is decreased and early pilot shot timing retarded based on retarding spark timing. Linking spark timing with early pilot shot quantity is considered to advantageously optimize the impact of available control knobs for phasing control.

Figure 5:
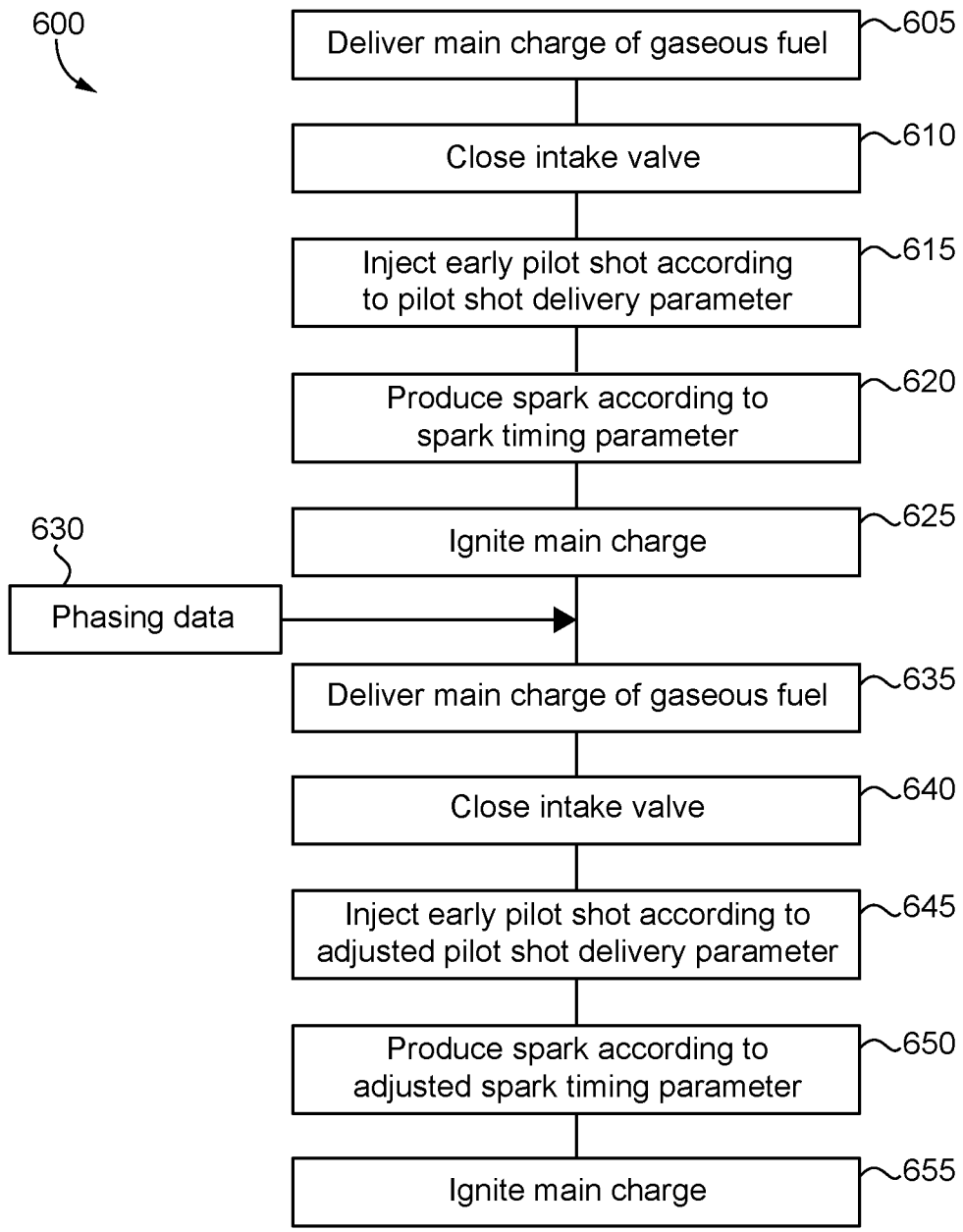
FIG. 5 is a flowchart illustrating example process and control logic flow, according to one embodiment.

Referring now to FIG. 5, there is shown a flowchart 600 illustrating example methodology and logic flow according to one embodiment. At a block 605 a main charge of gaseous fuel is delivered to cylinder 16. At a block 610 intake valve 26 is closed, such as at a first late closing timing. At a block 615 an early pilot shot is injected after closing the intake valve, based on a commanded injection according to a pilot shot delivery parameter, such as one or both of an early pilot shot quantity and an early pilot shot timing. At a block 620, a spark is produced according to a spark timing parameter. At a block 626 the main charge of gaseous fuel is ignited and combusted within cylinder 16 in a first engine cycle, in response to combustion of the early pilot shot of liquid fuel and production of the spark. Phasing data of the combustion is inputted at a block 630.

At a block 635 a main charge of gaseous fuel is delivered in a second engine cycle. At a block 640 intake valve 26 is closed, such as a second late closing timing. At a block 645 an early pilot shot is injected according to an adjusted pilot shot delivery parameter, such as an adjusted early pilot shot quantity and/or an adjusted early pilot shot timing. At a block 650 a spark is produced according to an adjusted spark timing parameter, and at a block 655 the main charge of gaseous fuel is ignited and combusted in the second engine cycle in response to combustion of the early pilot shot of liquid fuel and the spark. Blocks 645 and 650 include covarying of the spark timing parameter and the pilot shot delivery parameter from the first engine cycle to the second engine cycle, with an error in phasing of combustion reduced from the first engine cycle to the second engine cycle based on the covarying. Adjustment of the spark timing parameter can include advancing or retarding spark timing, and adjustment of the pilot shot delivery parameter can include advancing or retarding early pilot shot delivery timing and/or increasing or decreasing, respectively, early pilot shot quantity.

In one implementation advancing or retarding the early pilot shot timing includes advancing or retarding the early pilot shot timing to the same extent as the advancing or retarding of the spark timing. In other words, if spark timing is advanced by, say 4°, crank angle, early pilot shot timing can also be advanced by 4° crank angle. In another implementation, spark timing could be advanced by 4°, and early pilot shot timing advanced by 2°, 8°, or still another number. In a third engine cycle, not specifically depicted in FIG. 6, reducing an error in a phasing of combustion can be reduced relative to the second engine cycle based on adjustment to an intake valve timing parameter from the second engine cycle to the third engine cycle. It will be recalled that determining an intake valve closing command occurs in a slower loop calculation, and adjusting the spark timing parameter and determining a spark timing command may occur in a faster loop calculation. Accordingly, the adjustments to pilot shot delivery and spark timing may or may not occur in the same cycle-to-cycle pattern. Intake valve timing adjustment can even be thought of as running in the background, periodically updating intake valve closing timing in a closed loop fashion to ensure the principal control, spark timing, does not drift too far from a desired standard or set point, such as top dead center.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a dual fuel engine system comprising:
    igniting a main charge of gaseous fuel within a cylinder in a dual fuel engine in a first engine cycle in response to combustion of an early pilot shot of liquid fuel and production of a spark;
    igniting a main charge of gaseous fuel within the cylinder in the dual fuel engine in a second engine cycle in response to combustion of an early pilot shot of liquid fuel and production of a spark;
    covarying a spark timing parameter and a pilot shot delivery parameter from the first engine cycle to the second engine cycle; and
    reducing an error in a phasing of combustion from the first engine cycle to the second engine cycle based on the covarying of the spark timing parameter and the pilot shot delivery parameter from the first engine cycle to the second engine cycle.

2. The method of claim 1 wherein the covarying of the spark timing parameter and the pilot shot delivery parameter includes adjusting at least one of an early pilot shot timing or an early pilot shot quantity.

3. The method of claim 2 wherein the covarying of the spark timing parameter and the pilot shot delivery parameter further includes advancing or retarding a spark timing and increasing or decreasing, respectively, early pilot shot quantity.

4. The method of claim 3 wherein the covarying of the spark timing parameter and the pilot shot delivery parameter further includes advancing or retarding early pilot shot timing based, respectively, on the advancing or the retarding of the spark timing.

5. The method of claim 1 wherein the pilot shot delivery parameter is mapped to the spark timing parameter.

6. The method of claim 1 further comprising receiving phasing data for combustion of the main charge of gaseous fuel in the first engine cycle, and wherein the covarying of the spark timing parameter and the pilot shot delivery parameter is based on the phasing data.

7. The method of claim 1 further comprising varying an in-cylinder temperature from the second engine cycle to a third engine cycle, and reducing an error in a phasing of combustion from the second engine cycle to the third engine cycle based on the varying of the in-cylinder temperature.

8. The method of claim 7 further comprising calculating a main timing error, and wherein the varying of the in-cylinder temperature includes adjusting an intake valve late closing timing based on the main timing error.

9. The method of claim 8 wherein the adjusting of the intake valve late closing timing further includes determining an intake valve closing command in a slower loop calculation, and further comprising determining a spark timing command in a faster loop calculation.

10. A combustion control system for a dual fuel engine system comprising:
    a sparkplug having spark electrodes forming a spark gap and structured for producing an electrical spark within a cylinder in a dual fuel engine;
    an electrically actuated liquid fuel injector structured to directly inject an early pilot shot of liquid fuel into the cylinder in the dual fuel engine; and
    a combustion control unit coupled with the sparkplug and with the liquid fuel injector, the combustion control unit being structured to covary a spark timing parameter of the spark plug and a pilot shot delivery parameter of the liquid fuel injector, and to reduce an error in a phasing of combustion in the dual fuel engine system based on the covarying of the spark timing parameter and the pilot shot delivery parameter.

11. The combustion control system of claim 10 wherein the spark timing parameter includes a spark timing relative to a top dead center position of a piston in the dual fuel engine, and the pilot shot delivery parameter includes at least one of an early pilot shot timing or an early pilot shot quantity.

12. The combustion control system of claim 11 wherein the combustion control unit is further structured to covary spark timing with both early pilot shot timing and the early pilot shot quantity.

13. The combustion control system of claim 12 wherein the early pilot shot timing and the early pilot shot quantity are mapped to the spark timing.

14. The combustion control system of claim 10 further comprising an intake valve and a variable valve actuator coupled with the intake valve, and wherein the combustion control unit is further coupled with the variable valve actuator and structured to reduce an error in a phasing of combustion in the dual fuel engine system by varying a valve timing parameter of the intake valve.

15. The combustion control system of claim 14 wherein the valve timing parameter includes an intake valve late closing timing.

16. The combustion control system of claim 14 wherein the combustion control unit is further structured to covary the spark timing parameter and the pilot shot delivery parameter in a first loop calculation and to vary the valve timing parameter in a second loop calculation.

17. The combustion control system of claim 16 wherein the first loop calculation and the second loop calculation occur according to different time scales.

18. A method of operating a dual fuel engine system comprising:
    commanding injection of an early pilot shot of liquid fuel and production of a spark to ignite a main charge of gaseous fuel within a cylinder in a dual fuel engine;
    covarying a spark timing parameter and an early pilot shot delivery parameter based on a phasing of combustion of the main charge of gaseous fuel; and
    reducing an error in a phasing of combustion of another main charge of gaseous fuel ignited by combustion of an early pilot shot of liquid fuel and production of a spark, based on the covarying of the spark timing parameter and the pilot shot delivery parameter.

19. The method of claim 18 wherein the combustion control unit is further structured to reduce an error in a phasing of combustion of still another main charge of gaseous fuel ignited by combustion of an early pilot shot of liquid fuel and production of a spark at least in part by varying a valve timing parameter of an intake valve.

20. The method of claim 19 wherein the valve timing parameter includes an intake valve late closing timing.

\* \* \* \* \*